United States Patent [19]
Shimizu

[11] Patent Number: 6,075,664
[45] Date of Patent: Jun. 13, 2000

[54] WRITE CURRENT SETTING METHOD, AND RECORDING AND REPRODUCING DEVICE

[75] Inventor: Shoichi Shimizu, Kawasaki, Japan

[73] Assignee: Fujitsu Limited, Kawasaki, Japan

[21] Appl. No.: 09/018,198

[22] Filed: Feb. 3, 1998

[30] Foreign Application Priority Data

May 13, 1997 [JP] Japan ................................. 9-122593

[51] Int. Cl.⁷ ....................................................... G11B 5/09
[52] U.S. Cl. ............................................. 360/46; 360/53
[58] Field of Search ................................ 360/46, 68, 53; 369/59

[56] References Cited

FOREIGN PATENT DOCUMENTS

| | | |
|---|---|---|
| 60-143404 | 7/1985 | Japan . |
| 61-237209 | 10/1986 | Japan . |
| 63-167404 | 7/1988 | Japan . |
| 1-33703 | 2/1989 | Japan . |
| 1-245406 | 9/1989 | Japan . |
| 1-317208 | 12/1989 | Japan . |
| 2-304702 | 12/1990 | Japan . |
| 4-14604 | 1/1992 | Japan . |
| 5-258215 | 10/1993 | Japan . |
| 6-162412 | 6/1994 | Japan . |
| 6-231405 | 8/1994 | Japan . |
| 7-85409 | 3/1995 | Japan . |
| 9-7106 | 1/1997 | Japan . |

OTHER PUBLICATIONS

"Adaptive Magnetic Write Width Control", IBM Technical Disclosure Bulletin, vol. 35, No. 6, pp. 86–88, Nov. 1992.

*Primary Examiner*—W. Chris Kim
*Attorney, Agent, or Firm*—Greer, Burns & Crain, Ltd.

[57] ABSTRACT

A write current is set to be an optimum write current. The write current is supplied to a recording head when information is recorded on a recording medium. First margin characteristics are measured which are used for obtaining a lower limit value of the write current to be supplied to the recording head. Second margin characteristics are measured which are used for obtaining an upper limit value of the write current to be supplied to the recording head. As the lower limit value of the write current, a write current value is set for which a margin has a predetermined value in the first margin characteristics. As the upper limit value of the write current, a write current value is set for which a margin has a predetermined value in the second margin characteristics. As the optimum write current, a write current is set which has a middle value between the lower limit value of the write current and the upper limit value of the write current.

16 Claims, 15 Drawing Sheets

WRITE CURRENT SETTING METHOD, AND RECORDING AND REPRODUCING DEVICE

BACKGROUND OF THE INVENTION

1. Field of the Invention

The present invention relates to a write current setting method, and a recording and reproducing device. In particular, the present invention relates to a write current setting method, and a recording and reproducing device, in which the optimum write current of the device is set, the device recording information on a recording medium in accordance with the write current.

Recently, in a hard disk drive device, high-density recording and high-speed recording and reproducing have been performed. As high-density recording and high-speed recording and reproducing have been performed, optimizing of a recording current has been demanded. The recording current varies depending on the temperature.

In order to optimize the write current, it is necessary to set the write current so that maximum margins can be obtained in a low temperature condition and in a high temperature condition, respectively.

2. Description of the Related Art

FIG. 1 shows a plan view of one example of a magnetic disk device in the related art. In a magnetic disk device 11 shown in FIG. 1, an actuator 12 is provided with arms 13. A supporting spring mechanism 13a is provided to the extending end of each arm 13. Each arm 13 is provided with a magnetic head 14 at the extending end thereof. A base portion of the arms 13 is rotatably supported by a pivot 15. The arms 13 are positioned between adjacent ones of a plurality of magnetic disks 20 which will be described later.

A coil supporting portion 16 is provided at the side opposite to the arm 13 with respect to the pivot 15. A coil 17 is wound on the coil supporting portion 16. Two magnets 18a and 18b are fixed below the coil 17. The coil 17 and magnets 18a, 18b form a VCM (Voice Coil Motor).

In the magnetic disk device 11, the plurality of magnetic disks 20 are fixed to a spindle motor and are rotated by the spindle motor. The arm 13 is rotated as a result of a current being supplied to the coil 17 from a wiring board 21 via a flexible printed board 22. Thereby, with respect to these magnetic disks 20, the arms 13 are rotated so that each magnetic head 14 moves in a radial direction of the magnetic disks 20.

As each magnetic head 14, a thin-film head is used, and the magnetic heads 14 float by a predetermined amount due to the rotation of the magnetic disks 20, respectively. Each thin-film magnetic head 14 includes a write head formed as a result of forming a coil and a magnetic gap in a thin-film formation technique, and is formed on a slider. Each thin-film magnetic head 14 further includes a read head using a magneto-resistive device and is also formed on the slider. A predetermined current (write current) is supplied to the coil of the write head. Thereby, writing data to the respective magnetic disk 20 is performed through leakage magnetic flux occurring from converting electricity to magnetic flux. The data written on the magnetic disk is read through the read head and a waveform corresponding to the write current (amplitude of a read current) is obtained.

FIGS. 2A and 2B show graphs of a relationship between the write current and head characteristics. FIG. 2A shows the characteristics of the write current with respect to head output levels. FIG. 2B shows the characteristics of the write current with respect to overwrite gains. Generally speaking, the write current is determined from the saturation characteristics of the output levels of the magnetic head 14 (FIG. 2A) and the overwrite gains (FIG. 2B).

In the related art, the write current is determined from measuring the crosstalk characteristics between the heads and media and overwrite characteristics. From the determined write current, the resistance inside each magnetic disk is determined. Thus, the write current is fixed.

Further, the magnetic disks are affected by the temperature. Thereby, the optimum write current changes. Therefore, setting of the write current should be performed in consideration of the temperature variation.

Japanese Laid-Open Patent Application Nos. 63-167404, 1-245406 and 1-317208 proposed methods for setting the write current in accordance with the temperature.

In these arts, a temperature sensor and a table in which the optimum write currents are set for particular temperatures are provided inside a magnetic disk device. Thereby, the write current is controlled in accordance with the detected temperature of the temperature sensor. Thus, information can be written in a disk independent of the temperature. In these arts, the overwrite characteristics are measured and the optimum write currents are set.

However, in the related art, the crosstalk characteristics between heads and media and the overwrite characteristics are measured and the write current of a magnetic disk drive is determined. Accordingly, these measurements are difficult after these components are built in and circuits are connected therewith. If the measurements can be performed, the measurements require a long time.

In these arts of Japanese Laid-Open Patent Application Nos. 63-167404, 1-215406 and 1-317208, it is necessary to provide the temperature sensor and a memory in the magnetic disk device. Accordingly, the costs of the device are high. Further, in these arts, because the overwrite characteristics are used, a long time is required for setting the optimum write currents.

SUMMARY OF THE INVENTION

The present invention has been devised in consideration of the above-mentioned problems. An object of the present invention is to provide a write current setting method and a magnetic recording and reproducing device whereby the write current can be fixedly determined, the write current enabling minimization of the read margin decrease, independent of the temperature.

A write current setting method according to the present invention, for setting a write current to be an optimum write current, the write current being supplied to a recording head when information is recorded on a recording medium, comprises the steps of:

a) measuring first margin characteristics which are used for obtaining a lower limit value of the write current to be supplied to the recording head;

b) measuring second margin characteristics which are used for obtaining an upper limit value of the write current to be supplied to the recording head;

c) setting, as the lower limit value of the write current, a write current value for which a margin has a predetermined value in the first margin characteristics measured in the step a);

d) setting, as the upper limit value of the write current, a write current value for which a margin has a predetermined value in the second margin characteristics measured in the step b); and e) setting, as the optimum write current, a write current which has a middle value between the lower limit value of the write current set in the step c) and the upper limit value of the write current set in the step d).

In this method, the minimum write current for which the margin of the first margin characteristics is well maintained is set as the lower limit value of the write current. The maximum write current for which the margin of the second margin characteristics is well maintained is set as the upper limit value of the write current. Then, the middle value between the lower limit value and the upper limit value is determined to be the optimum write current. For the optimum write current, each of the margin of the first margin characteristics and the margin of the second margin characteristics is well maintained. Thus, by measuring the margin characteristics, the optimum write current can be easily obtained. Further, by using the optimum write current, good information writing can be always performed.

In the write current setting method according to the present invention, it may be that the first margin characteristics of the step a) are characteristics of a margin which increases as the write current increases.

In this method, the minimum write current for which the margin saturates can be set as the lower limit value of the write current. Thus, by measuring the margin characteristics, the optimum write current can be easily obtained.

In the write current setting method according to the present invention, it may be that the second margin characteristics of the step b) are characteristics of a margin which increases as the write current decreases.

In this method, the maximum write current for which the margin saturates can be set as the upper limit value of the write current. Thus, by measuring the margin characteristics, the optimum write current can be easily obtained.

In the write current setting method according to the present invention, it may be that the step a) obtains the first margin characteristics as a result of measuring a margin where the write current and a temperature are used as parameters.

In this method, the lower limit value of the write current can be obtained in consideration of not only the write current but also the temperature. Accordingly, the optimum write current, not being affected by the temperature, can be obtained. Thus, by measuring the margin characteristics, the optimum write current in consideration of the temperature variation can be obtained.

In the write current setting method according to the present invention, it may be that the step b) obtains the second margin characteristics as a result of measuring a margin where the write current and a temperature are used as parameters.

In this method, the upper limit value of the write current can be obtained in consideration of not only the write current but also the temperature. Accordingly, the optimum write current, not being affected by the temperature, can be obtained. Thus, by measuring the margin characteristics, the optimum write current in consideration of the temperature variation can be obtained.

In the write current setting method according to the present invention, it may be that the first margin characteristics of the step a) are characteristics of a slice level margin.

Because an amplitude of a signal read from the recording medium is larger as the write current increases, the slice level margin increases as the write current increases, and then, the slice level margin is well maintained. Therefore, the minimum write current for which the slice level margin saturates can be set as the lower limit value of the write current. Thus, by measuring the margin characteristics, the optimum write current can be easily obtained.

In the write current setting method according to the present invention, it may be that the second margin characteristics of the step b) are characteristics of a margin of recording density.

The characteristics of the margin of recording density are such that, as the write current increases, influence between adjacent tracks increases. As a result, the margin of recording density decreases. As the write current decreases, influence between adjacent tracks decreases. As a result, the margin of recording density increases and then is well maintained. Therefore, the maximum write current for which the margin of the recording density saturates can be set as the upper limit value of the write current. Thus, by measuring the margin characteristics, the optimum write current can be easily obtained.

In the write current setting method according to the present invention, it may be that the margin of recording density is a TPI (Track Per Inch) margin.

The characteristics of the TPI margin are such that, as the write current increases, influence between adjacent tracks increases. As a result, the TPI margin decreases. As the write current decreases, influence between adjacent tracks decreases. As a result, the TPI margin increases and then is well maintained. Therefore, the maximum write current for which the TPI margin saturates can be set as the upper limit value of the write current. Thus, by measuring the margin characteristics, the optimum write current can be easily obtained.

In a recording and reproducing device according to the present invention, in which information is recorded on a recording medium as a result of a previously set write current being supplied to a magnetic head, the magnetic head facing the recording medium, a lower limit value of the write current is determined from first margin characteristics;

an upper limit value of the write current is determined from second margin characteristics; and a write current which is has a middle value between the lower limit value and the upper limit value of the write current is fixedly set as the previously set write current.

The minimum write current for which the margin of the first margin characteristics is well maintained is set as the lower limit value of the write current. The maximum write current for which the margin of the second margin characteristics is well maintained is set as the upper limit value of the write current. Then, the middle value between the lower limit value and the upper limit value is determined to be the optimum write current. For the optimum write current, each of the margin of the first margin characteristics and the margin of the second margin characteristics is well maintained. Accordingly, by fixedly setting the thus-obtained optimum write current in the device, good information writing can be always performed in the device.

In the recording and reproducing device according to the present invention, it may be that the first margin characteristics are characteristics of a margin which increases as the write current increases.

Thereby, the minimum write current for which the margin saturates can be set as the lower limit value of the write current.

In the recording and reproducing device according to the present invention, it may be that the second margin characteristics are characteristics of a margin which increases as the write current decreases.

Thereby, the maximum write current for which the margin saturates can be set as the upper limit value of the write current.

In the recording and reproducing device according to the present invention, it may be that the first margin characteristics are obtained as a result of measuring a margin where the write current and a temperature are used as parameters.

Thereby, the lower limit value of the write current can be obtained in consideration of not only the write current but also the temperature. As a result, the optimum write current, not being affected by the temperature variation, can be fixedly set in the device.

In the recording and reproducing device according to the present invention, it may be that the second margin characteristics are obtained as a result of measuring a margin where the write current and a temperature are used as parameters.

Thereby, the upper limit value of the write current can be set in consideration of not only the write current but also the temperature. Thereby, the optimum write which is not affected by the temperature variation can be fixedly set in the device.

In the recording and reproducing device according to the present invention, it may be that the first margin characteristics are characteristics of a slice level margin.

As a result of measuring the slice level margin, because an amplitude of a signal read from the recording medium is larger as the write current increases, the difference between the slice levels can be enlarged. Accordingly the slice level margin increases as the write current increases, and then, is well maintained. Therefore, the minimum write current for which the slice level margin saturates can be determined as the lower limit value of the write current.

In the recording and reproducing device according to the present invention, wherein the second margin characteristics are characteristics of a margin of recording density.

As a result of measuring the margin of recording density, the characteristics of the margin of recording density are such that, as the write current increases, influence between adjacent tracks increases. As a result, the margin of recording density decreases. As the write current decreases, influence between adjacent tracks decreases. As a result, the margin of recording density increases and then is well maintained. Therefore, the maximum write current for which the margin of the recording density saturates can be determined as the upper limit value of the write current.

In the recording and reproducing device according to the present invention, it may be that the margin of recording density is a TPI (Track Per Inch) margin.

The characteristics of the TPI margin are such that, as the write current increases, influence between adjacent tracks increases. As a result, the TPI margin decreases. As the write current decreases, influence between adjacent tracks decreases. As a result, the TPI margin increases and then is well maintained. Therefore, the maximum write current for which the TPI margin saturates can be determined as the upper limit value of the write current.

Other objects and further features of the present invention will become more apparent from the following detailed description when read in conjunction with the accompanying drawings.

DETAILED DESCRIPTION OF THE PREFERRED EMBODIMENT

Figure 1:
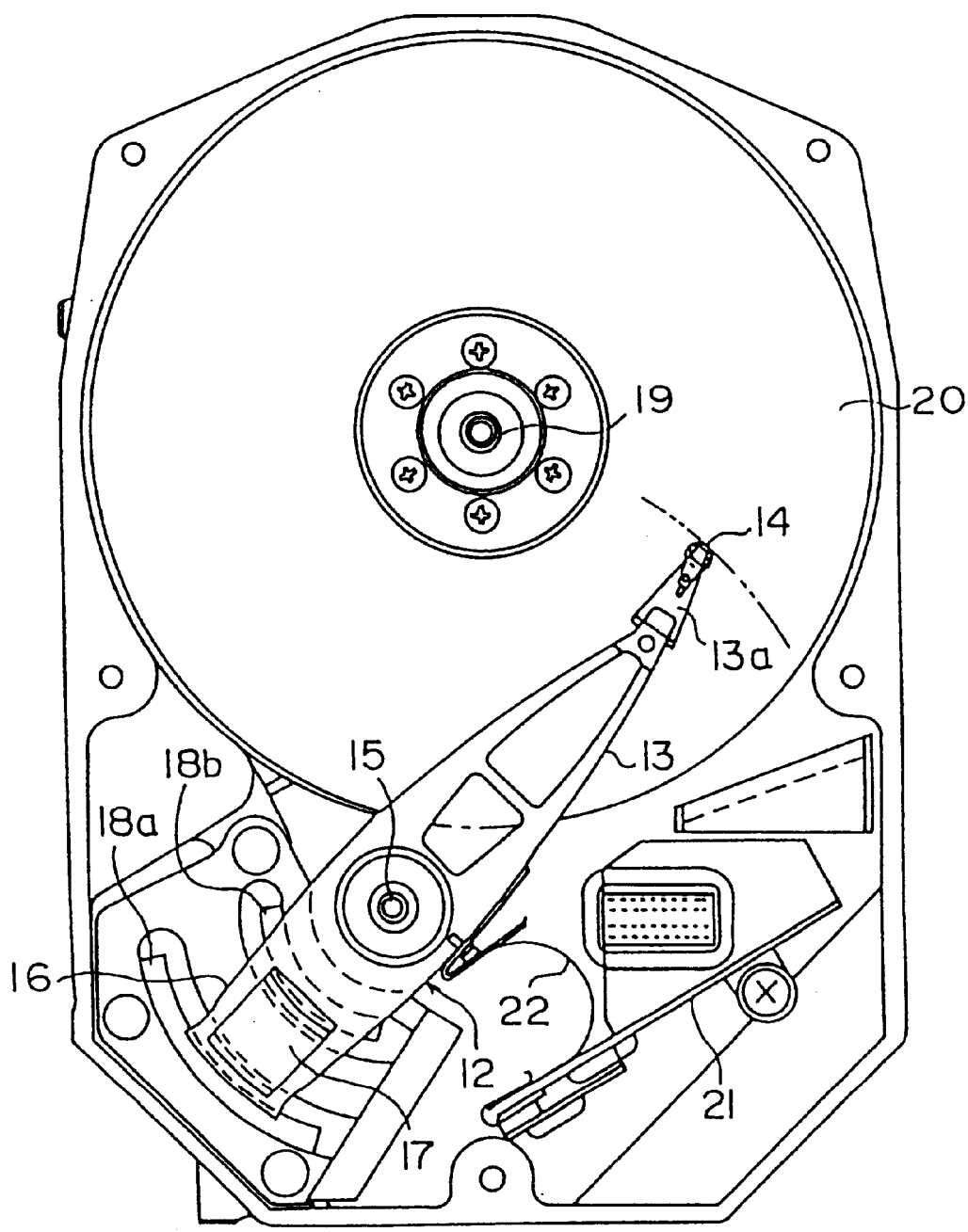
FIG. 1 shows a plan view of a magnetic disk device in the related art.
Figure 2A:
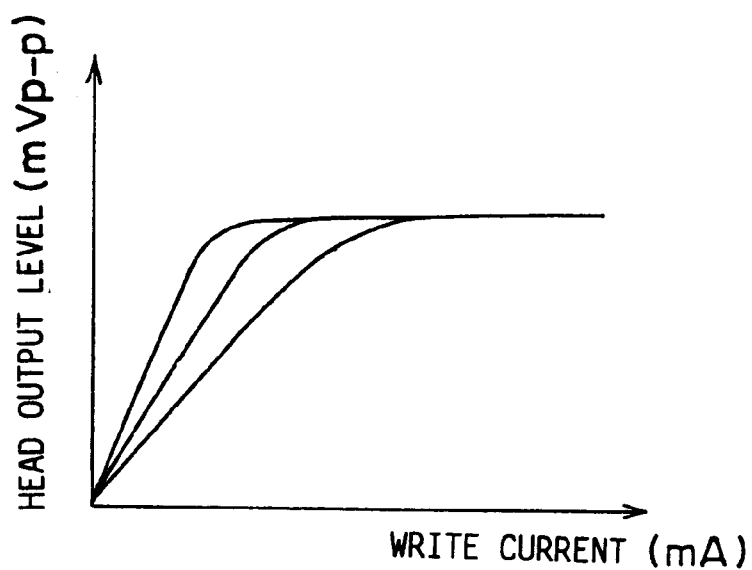
FIGS. 2A and 2B are graphs of a relationship between a write current and head characteristics.
Figure 2B:
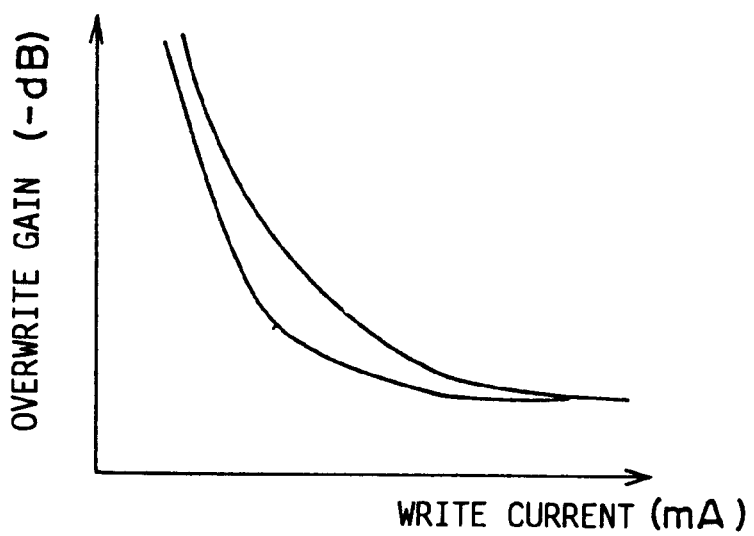
Figure 3:
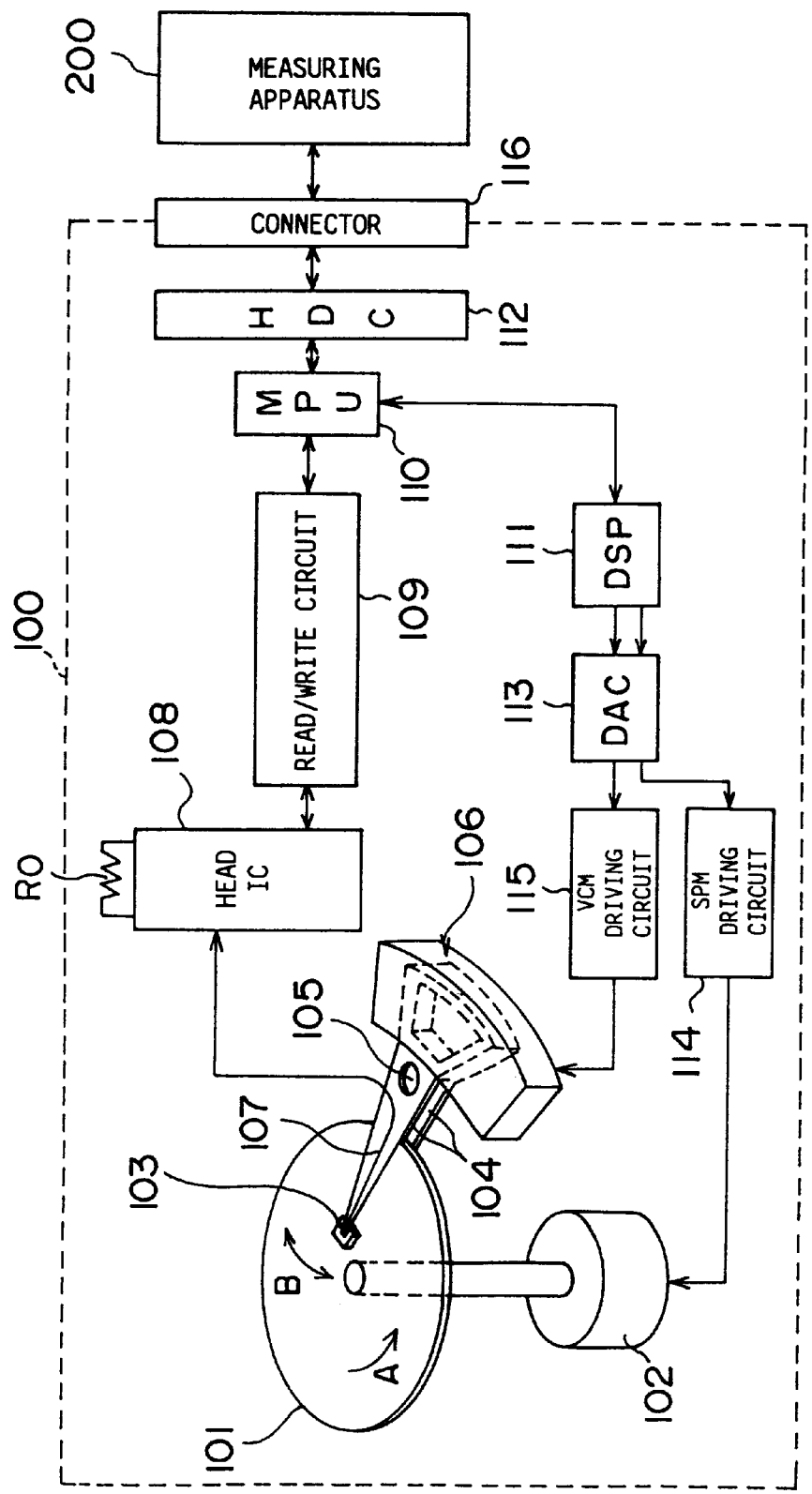
FIG. 3 shows a block diagram of one embodiment of the present invention.

FIG. 3 shows a block diagram of one embodiment of the present invention.

For this embodiment, a case where the write current of a magnetic disk device 100 is set will be described. The magnetic disk device 100 in which the write current will be set is connected to a measuring apparatus 200.

In the magnetic disk device 100, information is magnetically recorded on magnetic disk 101. The magnetic disk 101 is rotated by a spindle motor 102 in the arrow A direction.

A magnetic head 103 is positioned to face a surface of the magnetic disk 101. The magnetic head 103 magnetically affects and records information on the magnetic disk 101. Further, the magnetic head 103 reads information recorded on the magnetic disk 101. The magnetic head 103 is fixed to an arm 104. The magnetic head 103 slightly floats from the surface of the magnetic disk 101 due to the rotation of the magnetic disk 101. In this condition, the magnetic head 103 records information on the magnetic disk 101 and reproduces information from the magnetic disk 101.

The arm 104 is supported by a rotation shaft 105 in a manner in which the arm 104 can rotate about the rotation shaft 105. The arm 104 has the magnetic head 103 supported thereto at the extending end thereof. A voice coil motor 106 is provided opposite to the arm 104 with respect to the rotation shaft 105. The voice coil motor rotates the arm 104 in the arrow B directions about the rotation shaft 105. Thus, the magnetic head 103 moves in a radial direction of the magnetic disk 101.

The magnetic head 103 is connected to a head IC (Integrated Circuit) 108 via a connection line 107. The head IC 108 amplifies the write current when information is recorded on the magnetic disk 101. The head IC 108 also amplifies the read current which occurs in the magnetic head 103 due to change of magnetic flux of the magnetic disk 101. A resistor R0 is externally connected to the head IC 108. Using the resistor R0, the write current is adjusted. A standard resistor is used as the resistor R0 before the measuring apparatus 200 performs an optimum current determining operation.

The head IC 108 is connected to an MPU (Micro Processing Unit) 110 via a read/write circuit 109. The read/write circuit 109 encodes data supplied from the MPU 110 into a recording signal and decodes the read current read through the magnetic head 103 into data which the MPU 110 can process.

The MPU 110 is connected to the read/write circuit 109, a DSP (Digital Signal Processor) 111 and a HDC (Hard disk Drive Controller) 112. The MPU 110 processes information which will be recorded on the magnetic disk 101 and information which has been reproduced from the magnetic disk 101. Further, the MPU 110 controls the rotation of the magnetic disk 101 and positioning of the magnetic head 103 in accordance with information read from the magnetic disk 101 through the magnetic head 103.

The DSP 111 generates digital data, which controls the rotation of the spindle motor 102, in accordance with digital data, supplied from the MPU 110, which determines the rotation speed of the magnetic disk 101. Further, the DSP 111 generates digital data which controls the voice coil motor 106 in accordance with digital data, supplied from the MPU 110, which determines the position of the magnetic head 103.

The digital data, generated by the DSP 111, which controls the rotation of the spindle motor 102 and the digital data, generated by the DSP 111, which controls the rotation angle of the voice coil motor 106 are supplied to a DAC (Digital-to-Analog Converter) 113. The DAC 113 converts the digital data, supplied from the DSP 111, which controls the rotation of the spindle motor 102 and the digital data, supplied from the DSP 111, which controls the rotation angle of the voice coil motor 106 into analog signals, respectively.

The digital data supplied from the DSP 111 to the DAC 113 for controlling the rotation of the spindle motor 102 is supplied to a spindle motor driving circuit 114 after being converted into the analog signal in the DAC 113. In accordance with the analog signal supplied from the DAC 113, the spindle motor driving circuit 114 generates a driving signal which drives the spindle motor 102 and supplies the driving signal to the spindle motor. The spindle motor 102 is rotated by the driving signal supplied from the spindle motor driving circuit 114 and rotates the magnetic disk 101 in the arrow A direction at a fixed rotation speed.

The digital data supplied from the DSP 111 to the DAC 113 for controlling the rotation angle of the voice coil motor 106 is supplied to a voice coil motor driving circuit 115 after being converted into the analog signal in the DAC 113. In accordance with the analog signal supplied from the DAC 113, the voice coil motor driving circuit 115 generates a driving signal which drives the voice coil motor 106 and supplies the driving signal to the voice coil motor 106. The voice coil motor 106 is rotated by the driving signal supplied from the voice coil motor driving circuit 115, and rotates the magnetic head 103 in the arrow B directions, such that the rotation angle is controlled and the magnetic head 103 is positioned.

The HDC 112 is connected between the MPU 110 and an externally connecting connector 116. The HDC 112 controls data transmission and reception between the magnetic disk device 100 and an external equipment connected to the connector 116.

When the magnetic disk device 100 performs information recording and reproducing, the connector 116 is connected with an external equipment. Thereby, data and various control signals are input and output. When the optimum current is determined, the measuring apparatus 200 is connected to the connector 116.

Figure 4:
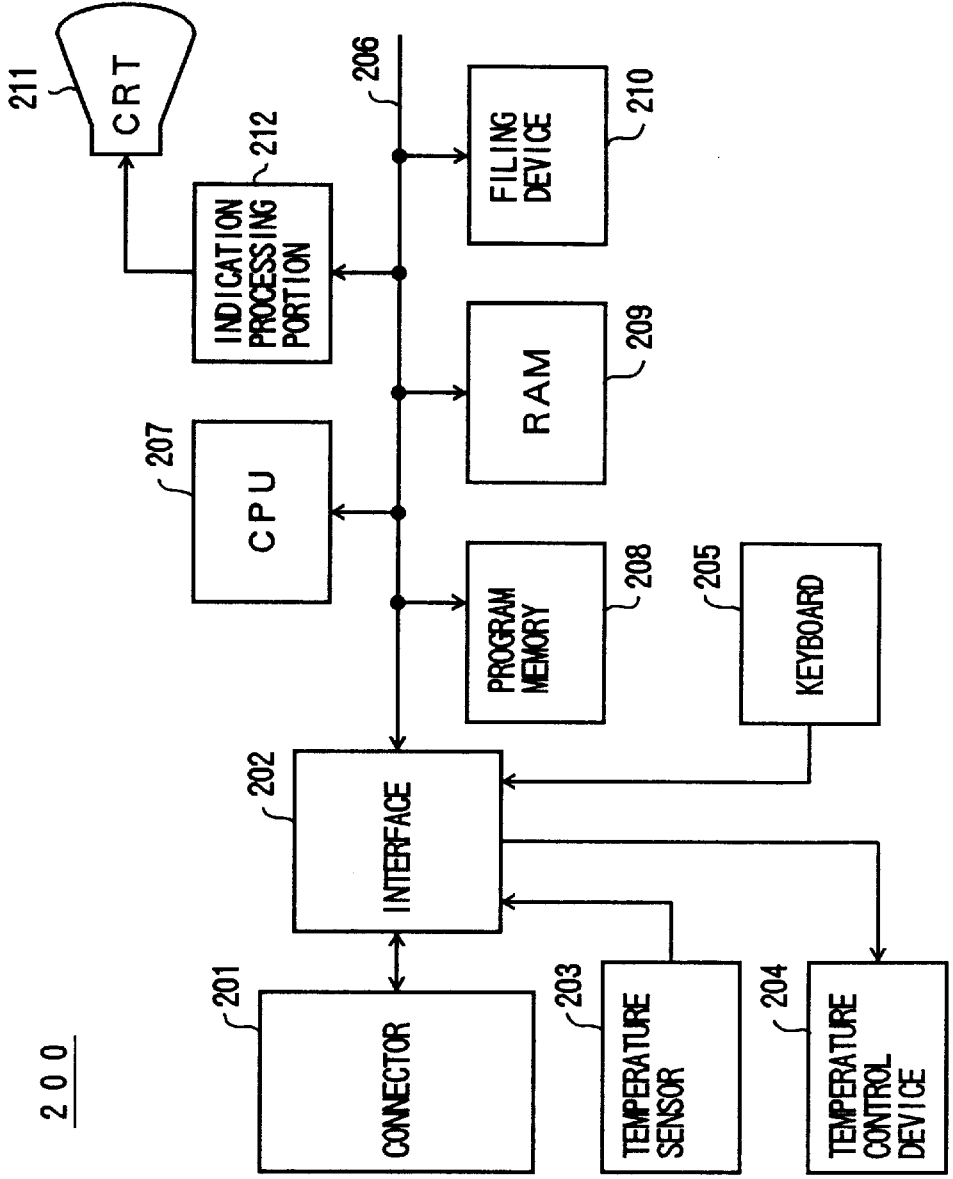
FIG. 4 shows a block diagram of a measuring apparatus in the embodiment of the present invention.

FIG. 4 shows a block diagram of the measuring apparatus in the embodiment of the present invention.

The measuring apparatus 200 is provided with a connector 201 for connecting to the magnetic disk device 100. The connector 116 of the magnetic disk device 100 is connected to the connector 201 via a cable.

The connector 201 is connected to an interface 202. Other than the connector 201, a temperature sensor 203 which measures the temperature of the magnetic disk device 100, a temperature control device 204 which controls the temperature of the magnetic disk device 100, a keyboard 205 for inputting instructions of measurement or the like and a bus 206 are connected to the interface 202.

The interface 202 transmits data to be output via the connector 201, receives data input via the connector 201, receives temperature data from the temperature sensor 203, transmits control data to the temperature control device 204, receives instructions via the keyboard, and controls input and output of various data from/to the bus 206.

A CPU (Central Processing Unit) 207 which performs data processing, a program memory 208 in which programs which are executed by the CPU 207 are stored, a RAM (Random Access Memory) 209 which provides a work area when the CPU 207 executes the programs stored in the program memory 208, a filing device 210 in which data processed by the CPU 207 is filed, and a indication processing portion 212 which processes data for indicating the data processed by the CPU 207 on a indicating device 211 are connected to the bus 206.

In the measuring apparatus 200, in response to the keyboard 205 being operated by a user, the programs stored in the program memory 208 are executed one by one. The optimum write current, which is to be set in the magnetic disk device 100, as described later, is determined. The determined data is indicated on the indicating device 211 and is filed in the filing device 210. The resistor R0 is determined so that the write current of the magnetic disk device 100 is the optimum write current determined by the measuring apparatus 200.

An optimum current determining method in the measuring apparatus 200 will now be described.

Figure 5:
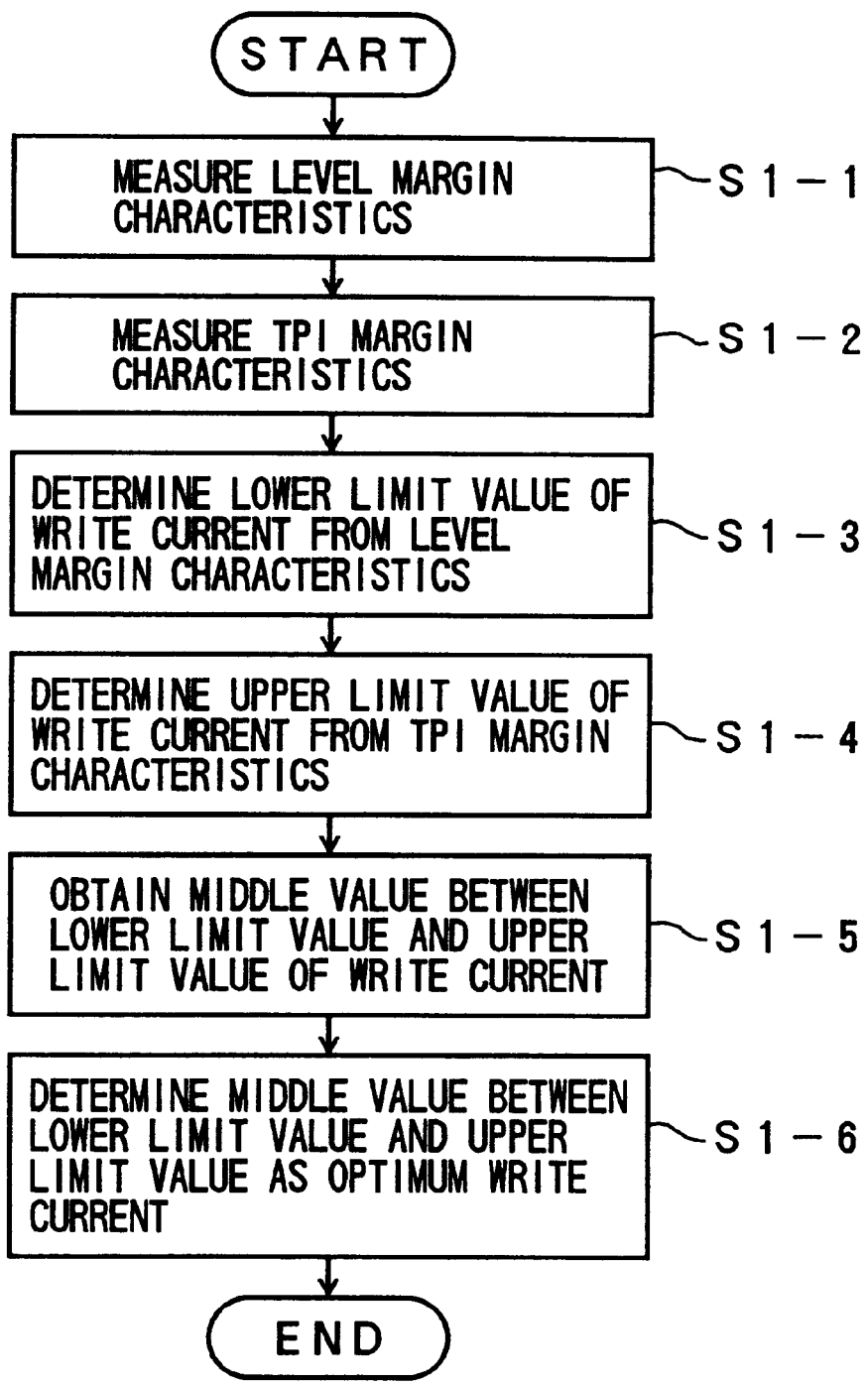
FIG. 5 shows a flowchart of an optimum write current determining operation performed by the measuring apparatus in the embodiment of the present invention.

FIG. 5 shows a flowchart of an optimum current determining operation in the measuring apparatus 200 in the embodiment of the present invention.

The measuring apparatus 200 first measures level margin characteristics in a step S1-1. This step is a first margin measuring step.

The level margin characteristics are measured by measuring level margins where the write current and the temperature of the magnetic disk device 100 are used as parameters. The level margin decreases as the write current decreases. Therefore, the level margin characteristics are used for determining the lower limit value of the write current.

A method of measuring the level margin characteristics in the step S1-1 will be described in detail.

Figure 6:
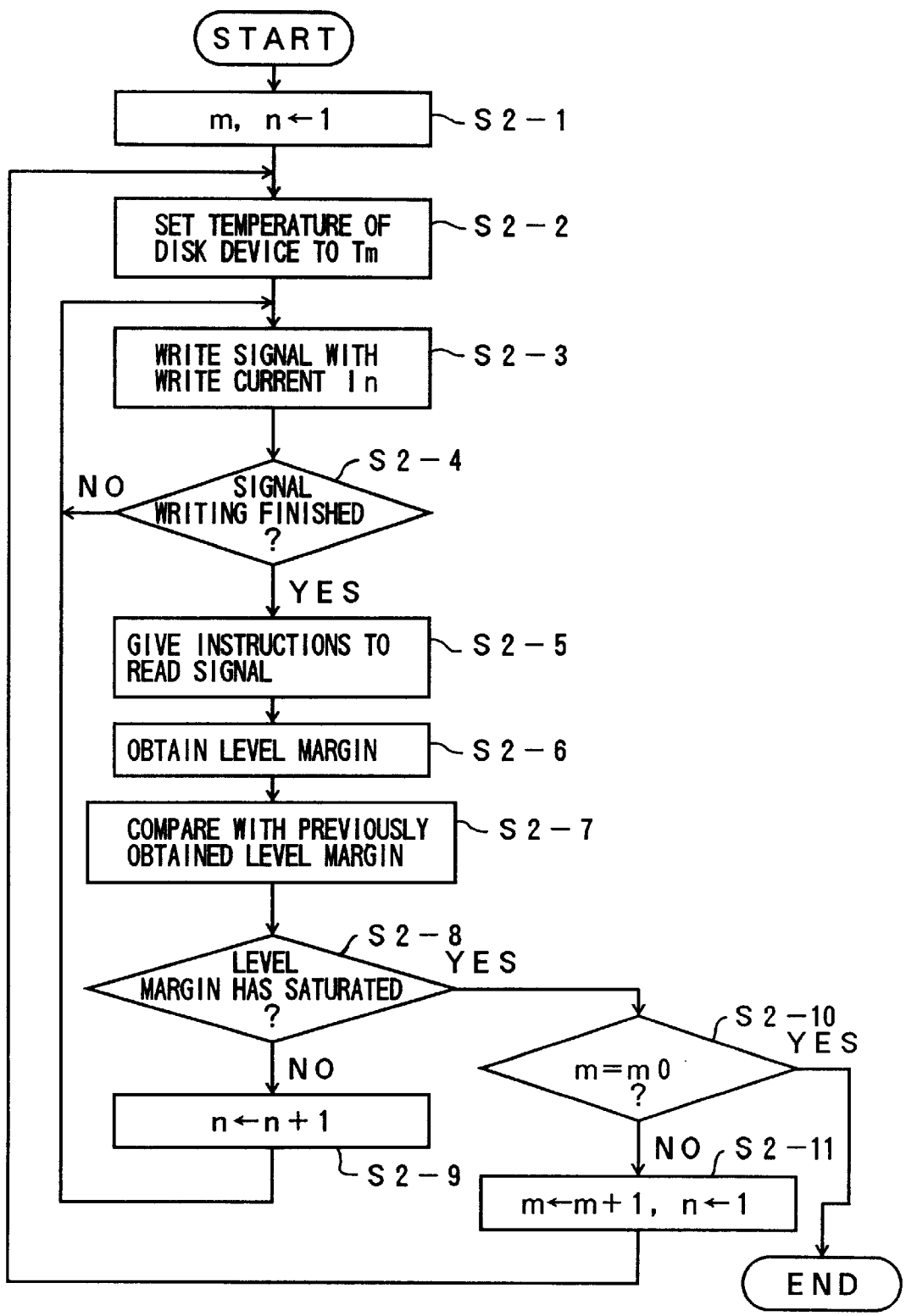
FIG. 6 shows a flowchart of a level margin characteristics measuring operation performed by the measuring apparatus in the embodiment of the present invention.
Figure 7A:
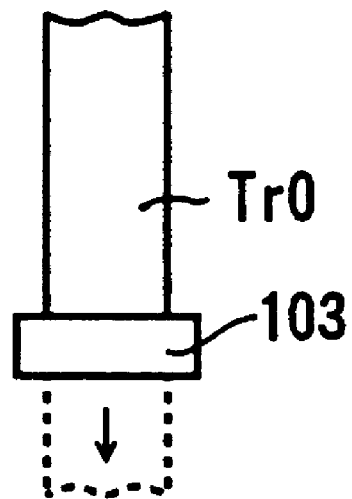
FIGS. 7A and 7B illustrate a level margin measuring operation in the embodiment of the present invention.
Figure 7B:
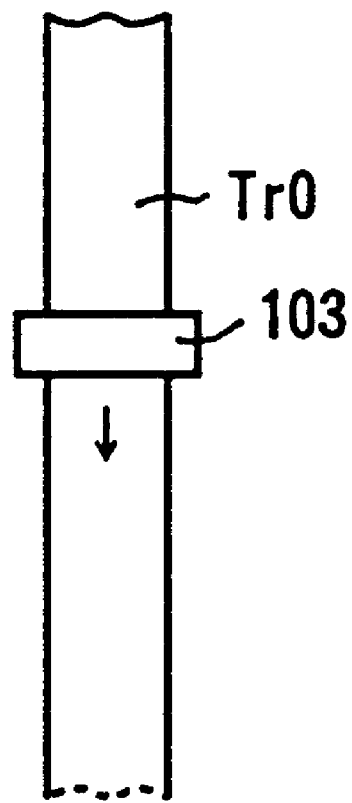

FIG. 6 shows a flowchart of a level margin characteristics measuring operation of the measuring apparatus 200 in the embodiment of the present invention. FIGS. 7A and 7B illustrate the level margin characteristics measuring operation.

In the level margin characteristics measuring operation, the measuring apparatus 200 sets "1" in each of variables m and n in a step S2-1.

Then, the measuring apparatus 200 sets the temperature of the magnetic disk device 100 to be a temperature Tm while detecting the temperature of the magnetic disk device 100 through the temperature sensor 203, in S2-2.

In S2-3, the measuring apparatus 200 gives the magnetic disk device 100 instructions to write a signal of a predetermined original digital data on the magnetic disk 101 with a predetermined write current In. Thereby, as shown in FIG. 7A, the signal is written on the magnetic disk 101 with the write current In through the magnetic head 103.

When writing of the signal on the magnetic disk 101 with the write current In through the magnetic head 103 is finished (Yes of S2-4), the measuring apparatus 200 gives the magnetic disk device 100 instructions to read the signal in an on-track condition, which signal has been written with the write current In, from the magnetic disk 101, in a step S2-5. The on-track condition is a condition where the center of a magnetic head is coincident with the center of a track. In S2-6, the measuring apparatus 200 obtains the level margin from the signal thus read in the magnetic disk device 100.

A method of obtaining the level margin will now be described.

Figure 8:
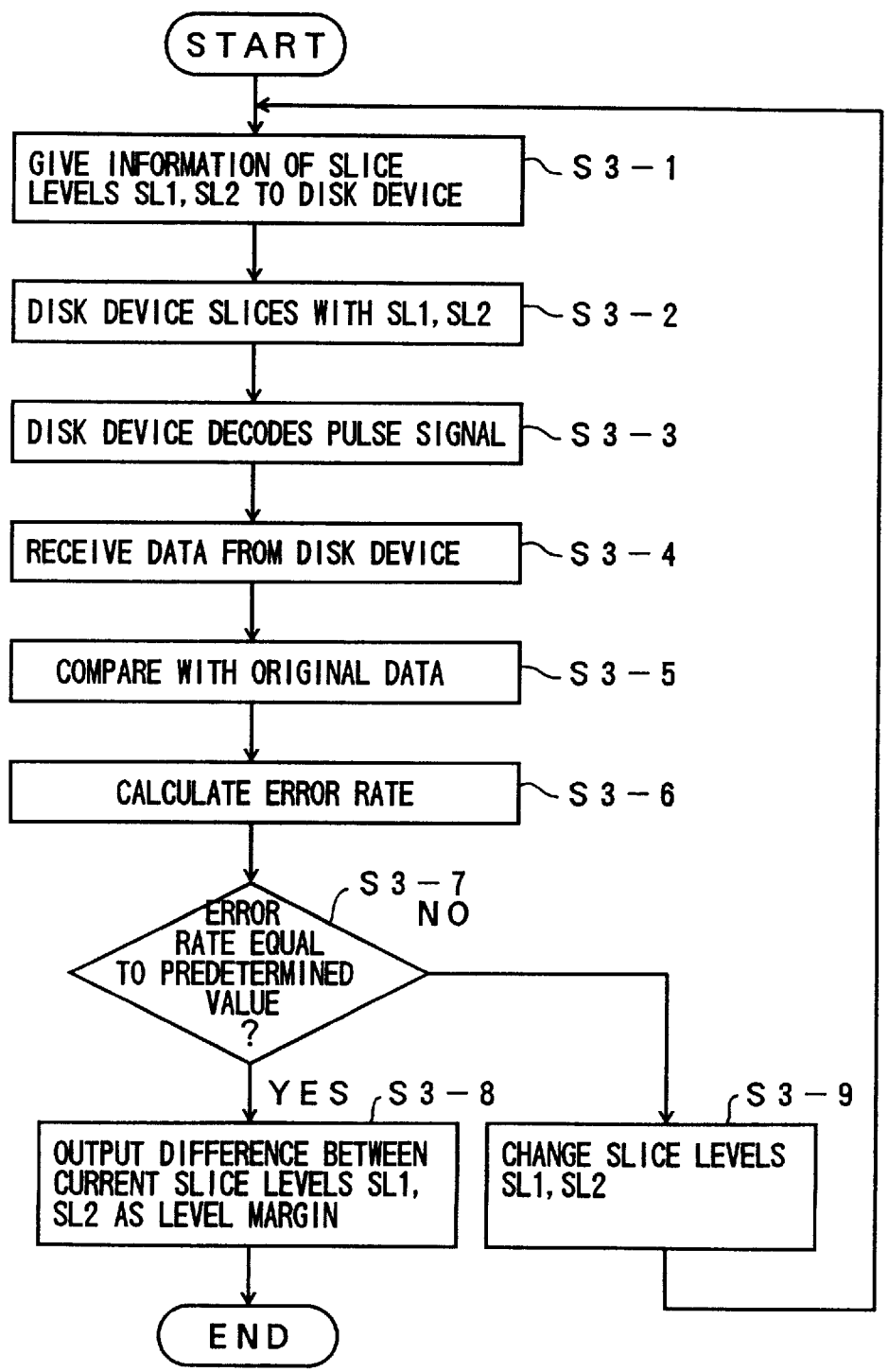
FIG. 8 shows a flowchart of a level margin obtaining operation performed by the measuring apparatus in the embodiment of the present invention.

FIG. 8 shows a flowchart of a level margin obtaining operation in the embodiment of the present invention. FIGS. 7A and 7B illustrate the level margin obtaining operation.

Figure 9:
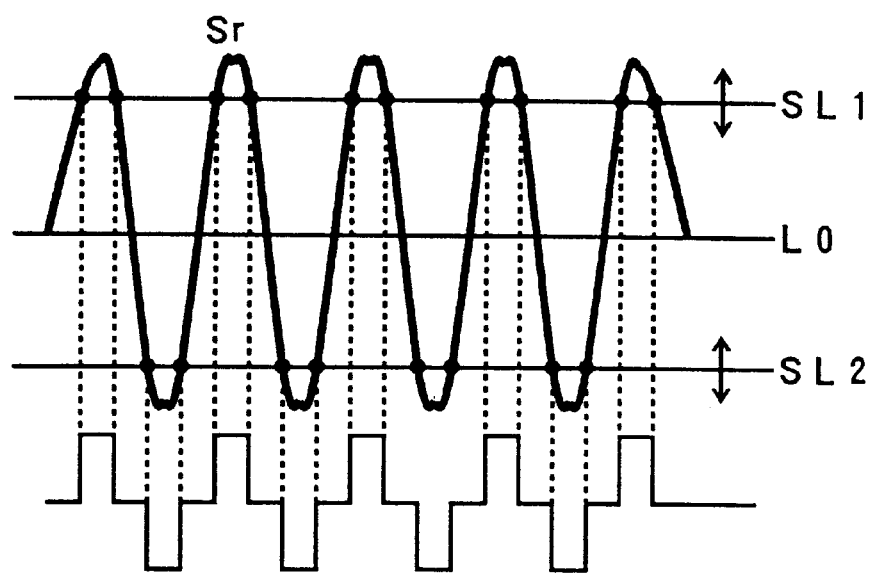
FIGS. 9A and 9B illustrate the level margin obtaining operation in the embodiment of the present invention.

The measuring apparatus 200 gives the magnetic disk device 100 data of slice levels SL1 and SL2 shown in FIG. 9A, in a step S3-1.

In a step S3-2, the magnetic disk device 100 slices the signal Sr with these slice levels SL1 and SL2, which signal Sr has been read from the magnetic disk 101 through the magnetic head 103 as mentioned above. Thus, the magnetic disk device 100 outputs a pulse signal shown in FIG. 9B.

In a step S3-3, the magnetic disk device 100 decodes this pulse signal, thus obtaining digital data, and outputs the digital data to the measuring apparatus 200. The measuring apparatus 200 receives this digital data in S3-4. The measuring apparatus 200 compares the received digital data with the above-mentioned original digital data in a step S3-5. From the comparison in the step S3-5, an error rate is obtained in a step S3-6. The error rate is a ratio of erroneously read data to the entire written data. Then, in a step S3-7, the measuring apparatus 200 determines whether or not the obtained error rate is equal to a predetermined value.

If it is determined in the step S3-7 that the obtained error rate is equal to the predetermined value, the difference between the current slice levels SL1 and SL2 are output as the level margin, in a step S3-8.

If it is determined in the step S3-7 that the obtained error rate is not equal to the predetermined value, the slice levels SL1 and SL2 are appropriately changed in a step S3-9. Then, the steps S3-1 through S3-7 and S3-8 are repeated until it is determined in the step S3-7 that the error rate obtained in the step S3-6 is equal to the predetermined value. Thus, the level margin is obtained.

Thus, the step S2-6 for obtaining the level margin of FIG. 6 is finished.

In the step 2-7 of FIG. 6, the measuring apparatus 200 compares the currently obtained level margin with the previously obtained level margin in a step S2-7. Thus, it is determined in a step S2-8 whether or not the level margin has saturated.

Specifically, in the step S2-8, when the currently obtained level margin is within a predetermined range from the previously obtained level margin, it is determined that the level margin has saturated. In the step S2-8, when the currently obtained level margin greatly varies and thus is out of the predetermined range from the previously obtained level margin, it is determined that the level margin has not saturated.

When it is determined in the step S2-8 that the level margin has not saturated, the measuring apparatus 200 increments the variable n by "1" in S2-9, and the write current In larger than the current write current In is set. Then, the operation returns to the step S2-3, and the level margin is obtained again for the larger write current In.

When it is determined in the step S2-8 that the level margin has saturated, it is determined in a step S2-10 whether the variable m has reached a predetermined value m0. When the variable m has not reached the predetermined value m0, in order to obtain the level margin for a temperature lower than the current temperature Tm, the variable m is incremented by "1" in a step S2-11. Further, in the step S2-11, "1" is set in the variable n. Then, the operation returns to the step S2-2, and the steps S2-2 through S2-9 are repeated so as to obtain the level margins for the lower temperature Tm.

When it is determined in the step S2-10 that the variable m has reached the predetermined value m0, this operation is finished. Thus, the level margins are obtained for the respective temperatures Tm, and also, for each temperature Tm, the level margins are obtained for the respective write currents In.

Thus, the level margin characteristics for the plurality of the temperatures Tm and for the plurality of write currents In for each temperature Tm are obtained.

Figure 10:
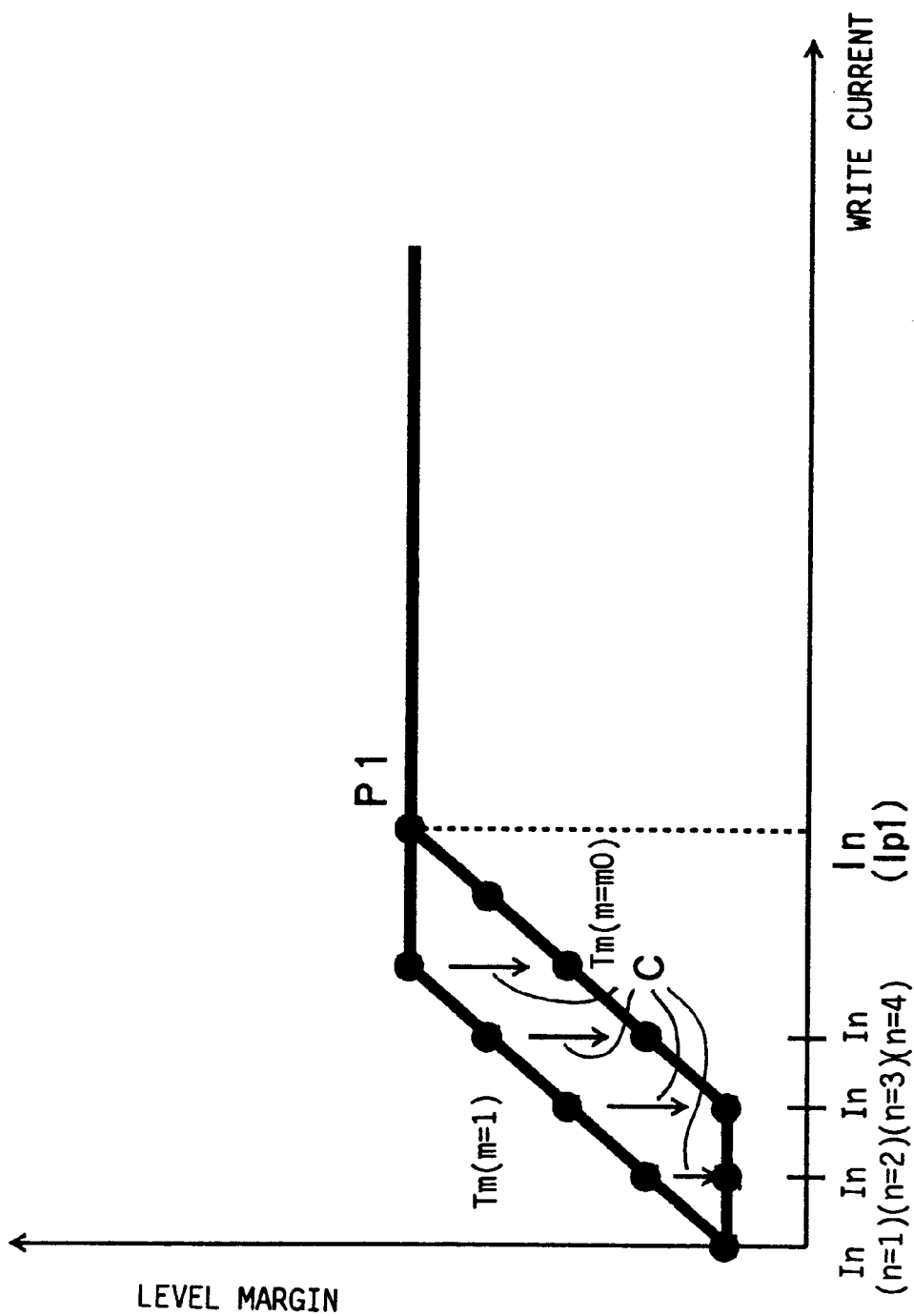
FIG. 10 shows level margin characteristics in the embodiment of the present invention.

FIG. 10 shows the level margin characteristics in the embodiment of the present invention.

The level margin is the margin of the slice levels. As the write current increases, the signal level read through the magnetic head 103 increases. Accordingly, when the write current is larger, the difference between the upper and lower slice levels can be larger, and, thus, the level margin can be larger.

Further, when the temperature becomes low, the intensity of magnetization of the magnetic disk 101 decreases. Accordingly, the signal level read through the magnetic head 103 decreases. As indicated by the arrows C shown in FIG. 10, when the temperature lowers from Tm (m=1) to Tm (m=m0), the level margin decreases although the write currents are the same.

Thus, measuring of the level margin characteristics in the step S1-1 shown in FIG. 5 is finished.

Then, the measuring apparatus 200 measures TPI (Track Per Inch: recording density) margin characteristics in a step S1-2.

As will be described later, the TPI margin characteristics are obtained from measuring TPI margins using the write current and the temperature of the magnetic disk device 100 as parameters. Because the TPI margin decreases as the write current increases, the TPI margin is used for measuring the upper limit value of the write current.

The measuring of the TPI margin characteristics in the step S1-2 will now be described.

Figure 11:
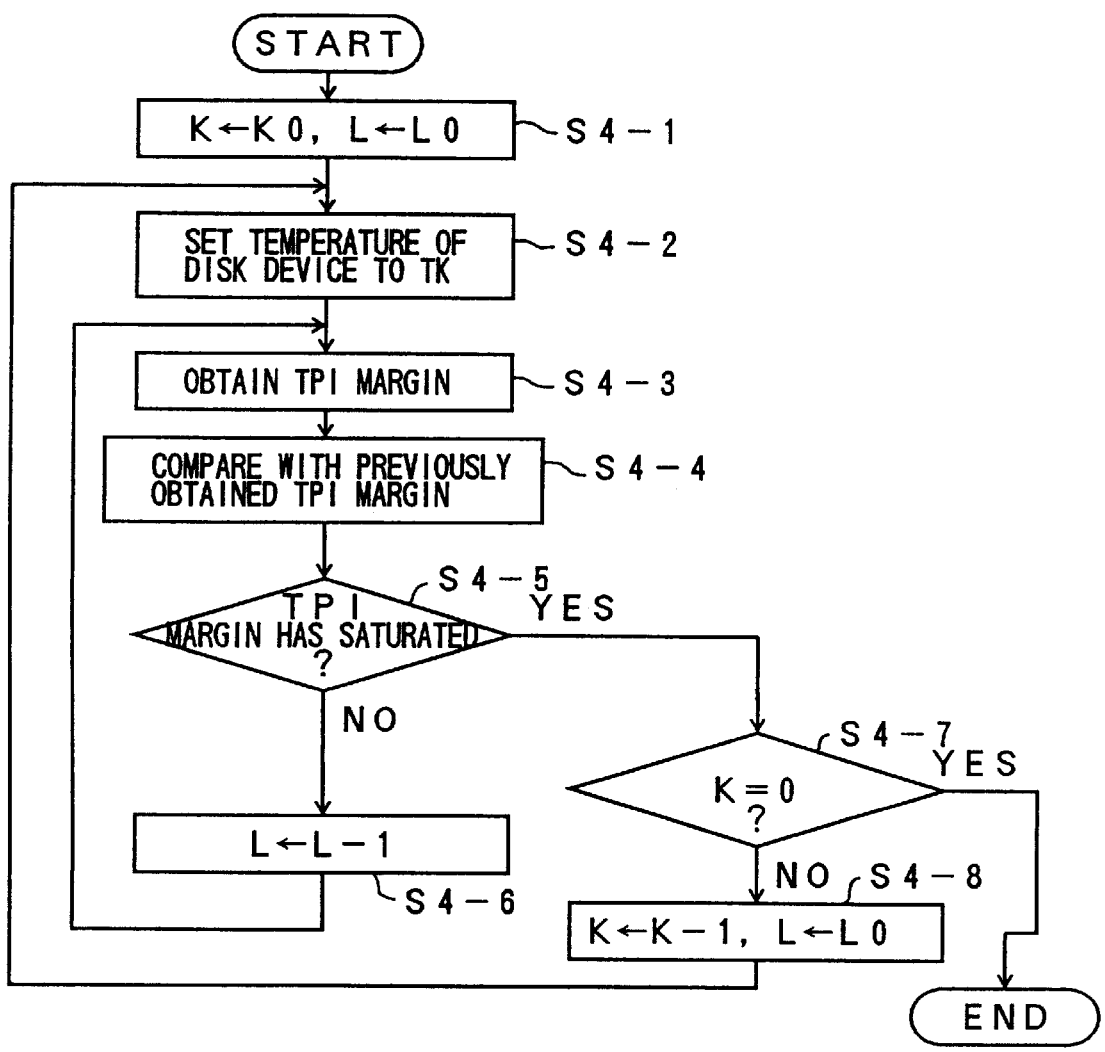
FIG. 11 shows a flowchart of a TPI margin characteristics measuring operation performed by the measuring apparatus in the embodiment of the present invention.

FIG. 11 shows a flowchart of a TPI margin characteristics measuring operation of the measuring apparatus 200 in the embodiment of the present invention.

In the TPI margin characteristics measuring operation, first, the measuring apparatus 200 sets a variable K to K0 and a variable L to L0 in a step S4-1.

Then, in a step S4-2, the measuring apparatus 200 controls the temperature control device 204 so as to set the temperature of the magnetic disk device 100 to TK as the measuring apparatus 200 detects the temperature of the magnetic disk device 100 using the temperature sensor 203.

In a step S4-3, the measuring apparatus 200 measures the TPI margins for a predetermined write current IL using the magnetic disk device 100.

A method of measuring the TPI margins in the step S4-3 will now be described.

Figure 12:
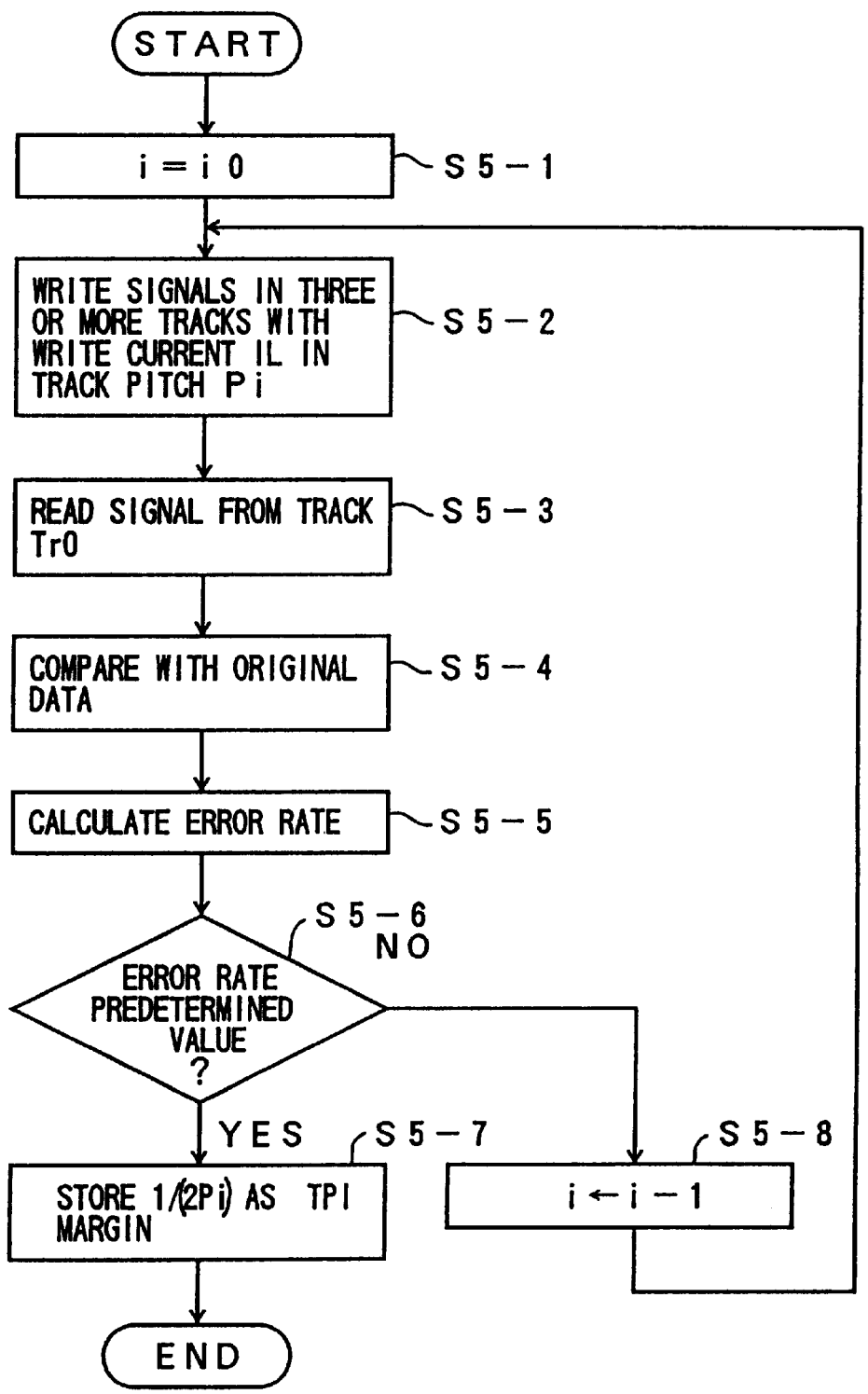
FIG. 12 shows a flowchart of a TPI margin obtaining operation performed by the measuring apparatus in the embodiment of the present invention.

FIG. 12 shows a flowchart of a TPI margin obtaining operation in the embodiment of the present invention. FIGS. 13A through 13D illustrate the TPI margin obtaining operation.

First, the measuring apparatus 200 sets a variable i to i0 in a step S5-1.

Figure 13A:
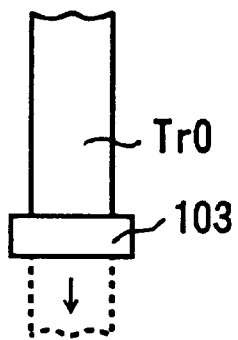
FIGS. 13A, 13B, 13C and 13D illustrate the TPI margin obtaining operation in the embodiment of the present invention.
Figure 13B:
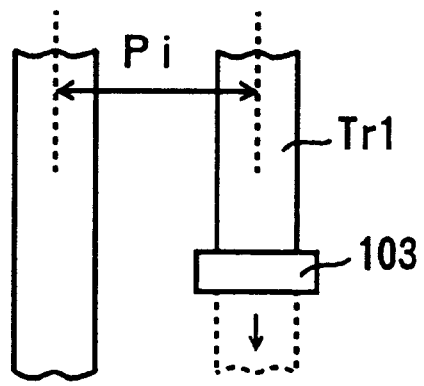
Figure 13C:
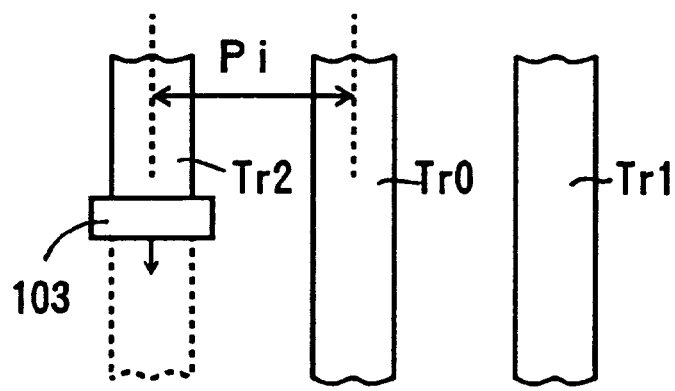

Then, in a step S5-2, the measuring apparatus 200 gives instructions to the magnetic disk device 100 to write signals in three or more tracks, respectively, with the write current IL in a predetermined track pitch Pi. In accordance with the instructions from the measuring apparatus 200, in the magnetic disk device 100, as shown in FIGS. 13A, 13B and 13C, the signals are written in the three tracks Tr0, Tr1 and Tr2 of the magnetic disk 101 with the write current IL in the predetermined track pitch Pi.

Figure 13D:
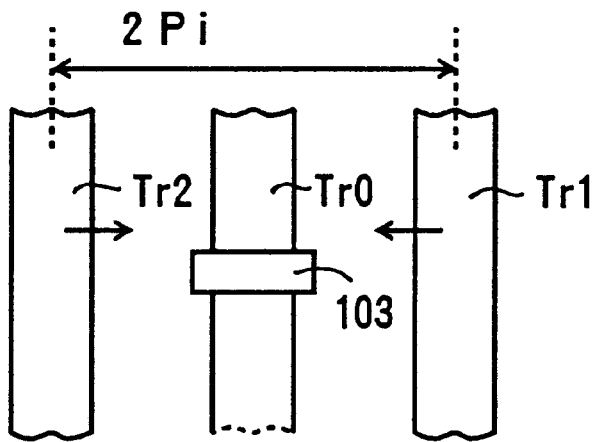

When the signal writing in the three tracks is finished, the measuring apparatus 200 gives instructions to the magnetic disk device 100 to read the signal of the track Tr0, which has been written with the write current IL, as shown in FIG. 13D, in a condition where the center of the magnetic head 103 is shifted from the center of the track Tr0 by a predetermined amount, in a step S5-3. Such a condition where the center of a magnetic head is shifted from the center of a track is referred to as an off-track condition. An amount by which the center of a magnetic head is shifted from the center of a track is referred to as an off-track amount. The magnetic disk device 100 supplies the thus-read digital data to the measuring apparatus 200.

The measuring apparatus 200 receives the digital data which has been supplied from the magnetic disk device 100, and compares the digital data with the original data (written in the track Tr0 in the step S5-2), in a step S5-4.

In a step S5-5, the measuring apparatus 200 calculates an error rate which is a ratio of error data to written data using the result of the comparison performed in the step S5-4.

In a step S5-6, the measuring apparatus 200 compares the error rate of which is the calculation result of the step S5-5 with a predetermined value, and determines whether or not the error rate calculated in the step 5-5 is equal to the predetermined value. When it is determined that the error rate calculated in the step 5-5 is equal to the predetermined value, the reciprocal of double the current track pitch Pi, that is, 1/(2Pi) is stored as the TPI margin, in S5-7.

When it is determined that the error rate calculated in the step 5-5 has not reached the predetermined value, the variant i is decremented by 1 in S5-8. Thereby, the track pitch Pi is reduced. Then, the operation returns to the step S5-2 and the calculation of the error rate is performed for the reduced track pitch Pi.

By repeating the above-mentioned steps S5-2 through S5-6, S5-8, the TPI margin is obtained. Thus, the obtaining the TPI margin in the step S4-3 of FIG. 11 is finished.

Then, the measuring apparatus 200 compares the currently obtained TPI margin with the previously obtained TPI margin, in a step S4-4, and determines whether or not the TPI margin has saturated, in a step S4-5. Specifically, when the currently obtained TPI margin is within a predetermined range from the previously obtained TPI margin in the step S4-5, it is determined that the TPI margin has saturated. In the step S4-5, when the currently obtained TPI margin greatly varies and thus is out of the predetermined range from the previously obtained TPI margin, it is determined that the TPI margin has not saturated.

When it is determined in the step S4-5 that the TPI margin has not saturated, the measuring apparatus 200 decrements the variable L by "1" in S4-6, and the write current IL smaller than the current write current IL is set. Then, the operation returns to the step S4-3, and the TPI margin is obtained again for the smaller write current IL.

When it is determined in the step S4-5 that the TPI margin has saturated, it is determined in a step S4-7 whether the variable K has reached "0". When the variable K has not reached "0", in order to obtain the TPI margin for a temperature lower than the current temperature TK, the variable K is decremented by "1" in a step S4-8. Further, in the step S4-8, L0 is set in the variable L. Then, the operation returns to the step S4-2, and the steps S4-2 through S4-6 are repeated so as to obtain the level margins for the lower temperature TK.

When it is determined in the step S4-7 that the variable K has reached "0", this operation is finished. Thus, the TPI margins are obtained for the respective temperatures TK, and also, for each temperature TK, the TPI margins are obtained for the respective write currents IL.

Thus, the TPI margin characteristics for the plurality of the temperatures TK and for the plurality of write currents IL for each temperature TK are obtained.

Figure 14:
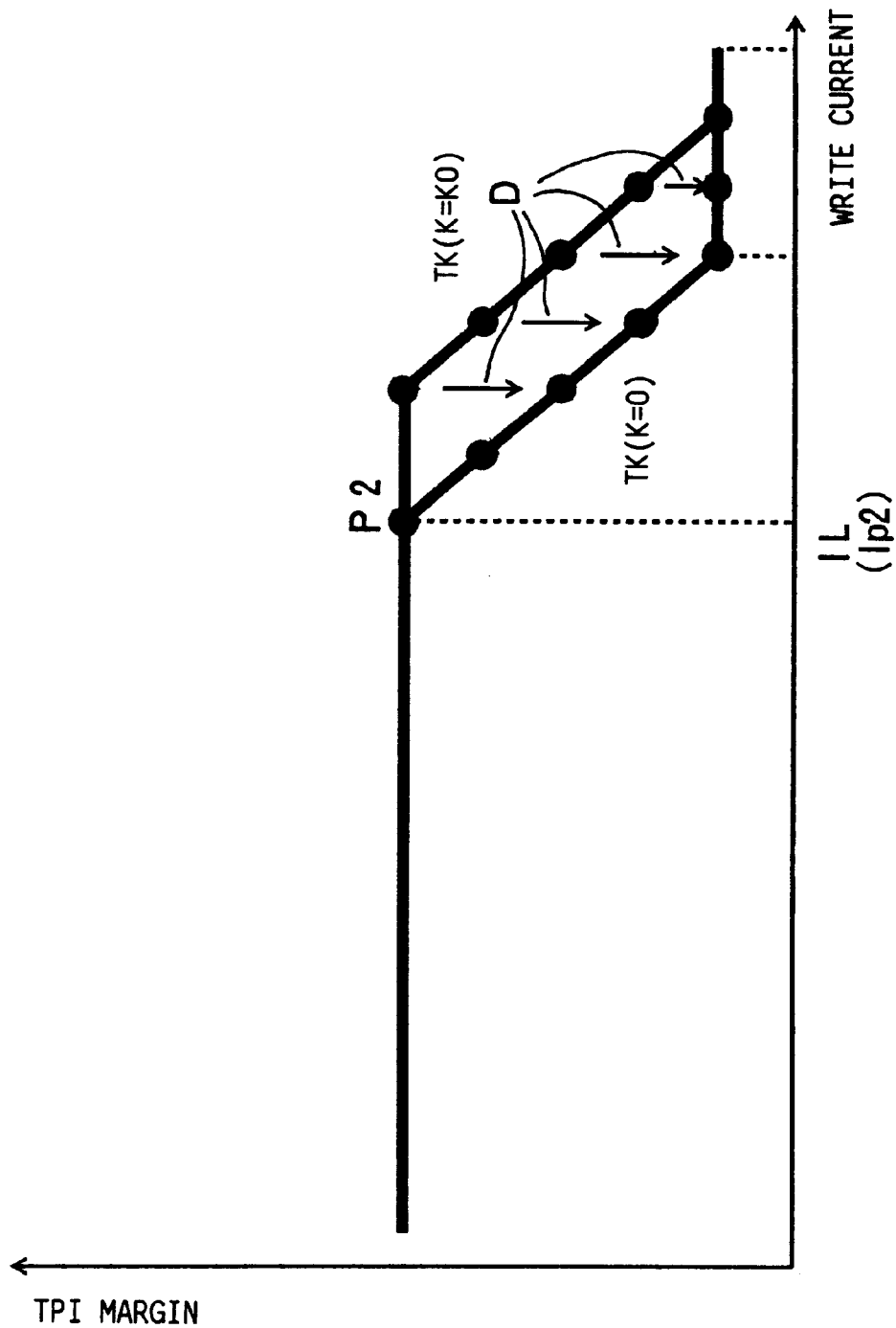
FIG. 14 shows TPI margin characteristics in the embodiment of the present invention.

FIG. 14 shows the TPI characteristics in the embodiment of the present invention.

The TPI margin is a margin of recording density. As the write current increases, a signal level read through the magnetic head 103 increases. As a result, the adjacent tracks affect the track from which a signal is read. Accordingly, errors occur, and thus the margin decreases.

When the temperature rises, the intensity of magnetization of the magnetic disk 101 increases. Accordingly, the signal level read through the magnetic head 103 increases. As indicated by the arrows D shown in FIG. 14, when the temperature rises from TK (K=K0) to TK (K=0), the TPI margins decrease although the write currents are the same.

Thus, measuring of the TPI margin characteristics in the step S1-2 shown in FIG. 5 is finished.

Then, in a step S1-3, the measuring apparatus 200 determines the lower limit value of the write current from the level margin characteristics such as that shown in FIG. 10 obtained in the step S1-1.

In the step S1-3, for example, the write current Ip1 of the point P1 at which the level margin saturates, as shown in FIG. 10, is set as the lower limit value.

Then, in a step S1-4, the measuring apparatus 200 determines the upper limit value of the write current from the TPI margin characteristics such as that shown in FIG. 14 obtained in the step S1-2.

In the step S1-4, for example, the write current Ip2 of the point P2 at which the TPI margin saturates, as shown in FIG. 14 is set as the upper limit value.

Then, in a step S1-5, the measuring apparatus 200 obtains the write current Ic (see FIG. 15) which has a middle value between the lower limit value obtained in the step S1-3 and the upper limit value obtained in the step S1-4. In a step S1-6, the obtained middle write current Ic is stored, as the optimum write current, in the filing device 210 (shown in FIG. 4).

Figure 15:
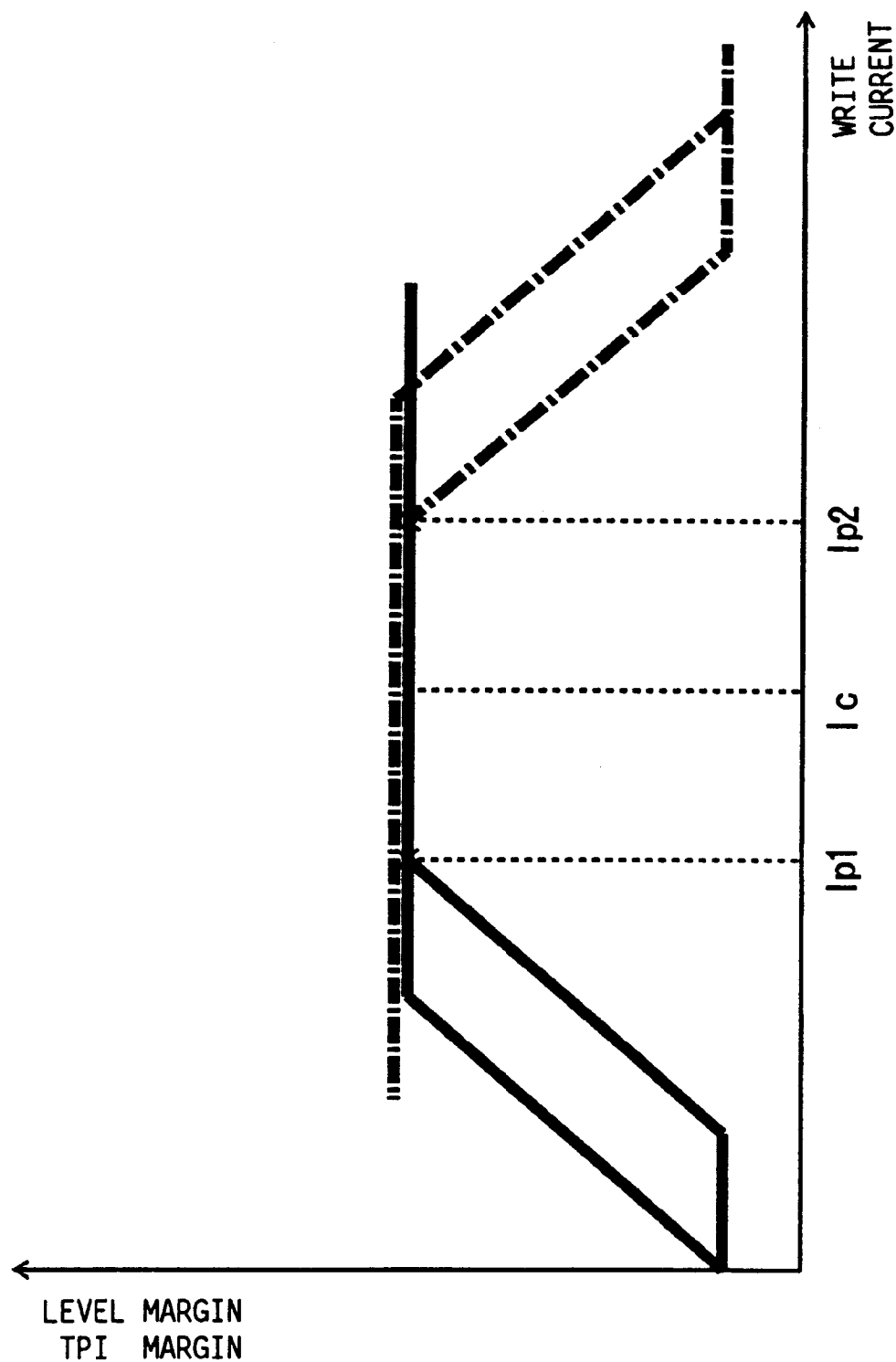
FIG. 15 illustrates the optimum write current determining operation in the embodiment of the present invention.

FIG. 15 illustrates an optimum write current determining operation in the embodiment of the present invention. In the figure, the solid line represents the level margin characteristics for the write current while the chain line represents the TPI margin characteristics for the write current.

When the write current is equal to or more than the lower limit value Ip1, the level margin can be maintained maximum. When the write current is equal to or less than the upper limit value Ip2, the TPI margin can be maintained maximum.

Accordingly, by determining the middle value Ic between the lower limit value Ip1 and upper limit value Ip2 as the optimum write current, each of the level margin and the TPI margin can be maintained maximum. Thus, by measuring margins, the optimum write current can be easily obtained.

Because the lower limit value Ip1 and the upper limit value Ip2 are obtained from the level margin characteristics and the TPI margin characteristics which have been measured at the plurality of temperatures, the thus-obtained optimum write current is not affected by the temperature.

The resistance value of the resistor R0 of the magnetic disk device 100 (shown in FIG. 3) is determined so that the magnetic head 103 writes a signal on the magnetic disk 101 with the thus-obtained optimum write current. The above-described optimum current determining operation shown in FIG. 5 is performed as a result of sampling data from the magnetic disk device in a manufacturing process. It is possible to perform the optimum current determining operation on all the magnetic disk devices in a manufacturing process.

In the embodiment, the level margin characteristics are used for determining the lower limit value of the write current. However, it is not necessary to be limited thereto. Other margin characteristics in which a margin stabilizes as the write current increases can be used for the same purpose. For example, offset (or off-track) margin characteristics can be used.

An offset margin corresponds to the off-track amount such that a signal can be read from a track with a predetermined error rate in the off-track condition with this off-track amount. As the write current increases, the off-track amount can be enlarged in the condition where a signal is read from a track with a predetermined error rate. Accordingly, the offset margin increases. Thus, the offset margin characteristics have a character similar to the level margin characteristics. Therefore, similar to the level margin characteristics, the offset margin characteristics can be used for determining the lower limit value of the write current.

In the embodiment, the TPI margin characteristics are used for determining the upper limit value of the write current. However, it is not necessary to be limited thereto. Other margin characteristics in which a margin stabilizes as the write current decreases can be used for the same purpose.

Further, in the embodiment, the magnetic disk device has been described. However, the present invention is not limited thereto. As long as setting or determining of the write current is concerned, the present invention can be embodied in, for example, an information recording device having an optical recording head such as an optical disk device, a magneto-optical disk device and so forth.

Further, in the embodiment, the write current determining operation shown in FIGS. 5 through 15 is performed in a device assembling process. Specifically, the measuring apparatus 200 is connected to the magnetic disk device 100, and, in the method such as that described with reference to FIGS. 5 through 15, the optimum write current is determined, and the fixed-resistance resistor R0 is used for setting the optimum write current in the magnetic disk device 100. However, it is also possible that the setting of the write current is performed by an EEPROM (Electrically Erasable and Programing ROM) instead of the fixed-resistance resistor R0. Specifically, when a power supply starts, when the number of times of error occurrence exceeds a predetermined value, or periodically, the MPU 110 in the magnetic disk device 100 or a host apparatus which is connected with the magnetic disk device 100 performs an optimum write current determining operation such as that shown in FIGS. 5 through 15. Then, by appropriately changing the setting of the EEPROM, the write current is set to be the optimum write current.

Further, the present invention is not limited to the above-described examples and embodiment, and variations and modifications may be made without departing from the scope of the present invention.

What is claimed is:

1. A write current setting method for setting a write current to be an optimum write current, said write current being supplied to a recording head when information is recorded on a recording medium, said method comprising the steps of:

a) measuring first margin characteristics which are used for obtaining a lower limit value of the write current to be supplied to said recording head;

b) measuring second margin characteristics which are used for obtaining an upper limit value of the write current to be supplied to said recording head;

c) setting, as the lower limit value of the write current, a write current value for which a margin has a predetermined value in said first margin characteristics measured in said step a);

d) setting, as the upper limit value of the write current, a write current value for which a margin has a predetermined value in said second margin characteristics measured in said step b); and e) setting, as the optimum write current, a write current which has a middle value between the lower limit value of the write current set in said step c) and the upper limit value of the write current set in said step d).

2. The write current setting method according to claim 1, wherein the first margin characteristics of said step a) are characteristics of a margin which increases as the write current increases.

3. The write current setting method according to claim 1, wherein the second margin characteristics of said step b) are characteristics of a margin which increases as the write current decreases.

4. The write current setting method according to claim 1, wherein said step a) obtains the first margin characteristics as a result of measuring the margin where the write current and a temperature are used as parameters.

5. The write current setting method according to claim 1, wherein said step b) obtains the second margin characteristics as a result of measuring the margin where the write current and a temperature are used as parameters.

6. The write current setting method according to claim 1, wherein the first margin characteristics of said step a) are characteristics of a slice level margin.

7. The write current setting method according to claim 1, wherein the second margin characteristics of said step b) are characteristics of a margin of recording density.

8. The write current setting method according to claim 7, wherein the margin of recording density is a TPI (Track Per Inch) margin.

9. A recording and reproducing device comprising:
a recording medium on which information is recorded;
a magnetic head which faces and records information on the recording medium; and
a write current supplying circuit which supplies a write current to said magnetic head so that said magnetic head records information on the recording medium,
wherein:
a lower limit value of the write current is determined from first margin characteristics;
an upper limit value of the write current is determined from second margin characteristics; and
the write current which said write current supplying circuit supplies to said magnetic head has a middle value between the lower limit value and the upper limit value.

10. The recording and reproducing device according to claim 9, wherein the first margin characteristics are characteristics of a margin which increases as the write current increases.

11. The recording and reproducing device according to claim 9, wherein the second margin characteristics are characteristics of a margin which increases as the write current decreases.

12. The recording and reproducing device according to claim 9, wherein the first margin characteristics are obtained as a result of measuring the margin where the write current and a temperature are used as parameters.

13. The recording and reproducing device according to claim 9, wherein the second margin characteristics are obtained as a result of measuring the margin where the write current and a temperature are used as parameters.

14. The recording and reproducing device according to claim 9, wherein the first margin characteristics are characteristics of a slice level margin.

15. The recording and reproducing device according to claim 9, wherein the second margin characteristics are characteristics of a margin of recording density.

16. The recording and reproducing device according to claim 15, wherein the margin of recording density is a TPI (Track Per Inch) margin.

* * * * *